Patented July 25, 1944

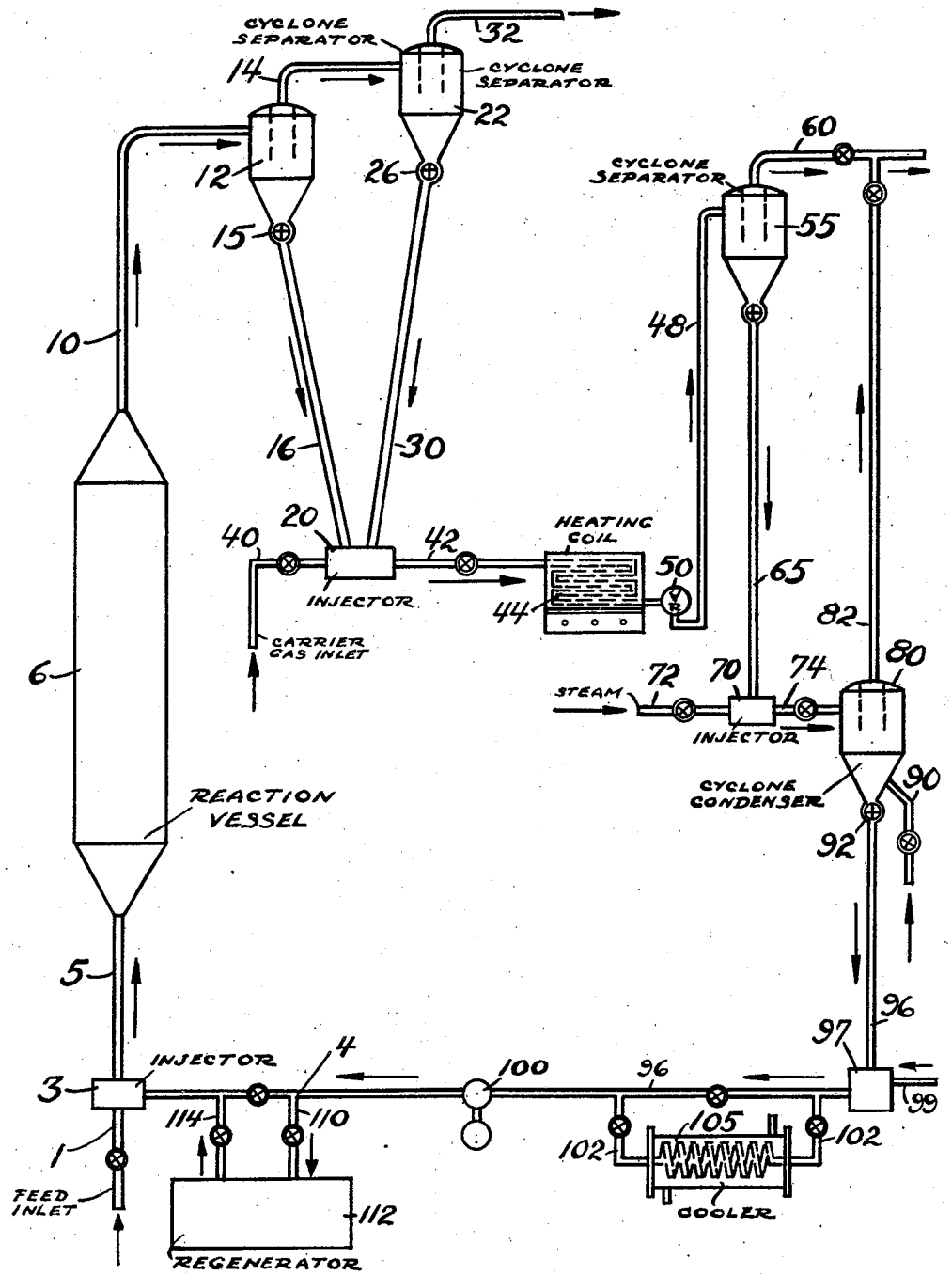

2,354,261

UNITED STATES PATENT OFFICE 2,354,261

SYNTHESIS OF HYDROCARBONS

Charles E. Hemminger, Westfield, N. J., assignor, by mesne assignments, to Standard Catalytic Company, a corporation of Delaware Application October 24, 1941, Serial No. 416,323

9 Claims. (Cl. 260—683.15)

The present invention relates to the art of treating hydrocarbons and more particularly it relates to the art of synthesizing relatively heavier hydrocarbons from relatively lower molecular weight hydrocarbons or gases in the presence of a powdered catalyst.

In many hydrocarbon syntheses, such as polymerization of olefins or the Fischer synthesis, the reaction takes place in the presence of a catalyst. These syntheses are favored by pressure.

According to my present invention, the foregoing type of synthesis may be carried out by continuously using a powdered catalyst under conditions such that the synthesis takes place under elevated pressures and the product is adsorbed by the catalyst. Thereafter, the product is released from the catalyst at lower pressures in a product separation zone.

My invention will be best understood by reference to the accompanying drawing in which I have chosen for purposes of illustration, an apparatus in which the polymerization of olefins may be carried out.

I shall now set forth a specific example illustrating my invention, and I shall refer to the accompanying drawing. It will be understood that the specific conditions I am about to set forth are purely illustrative and do not constitute a limitation on my invention.

Referring in detail to the drawing, isobutylene heated to a temperature of say 200° F.–400° F. or higher, is introduced into the system from some source through line 1 and thence discharged into an injector 3 where it is admixed with a catalyst such as orthophosphoric acid supported on kieselguhr, the catalyst preferably being in the form of powder having a particle size of from 50–400 mesh. In the injection means a suspension of the catalyst in the olefin gas is formed and this suspension is withdrawn through line 5 and discharged into an up-flow reaction drum or vessel 6. The gas velocity in the reactor 6 is from 5 to 12 feet per second and the proportions of catalyst to gas are such that the suspension formed weighs from 5 to 35 pounds per cubic foot. A temperature of from about 350 to 450° F. is maintained in the reaction zone. The pressure maintained in reactor 6 is superatmospheric and preferably is within the range of from about 100 to 700 lbs./sq. in. gauge pressure. The residence time of the reactants in the reaction zone is from about 5 to 15 seconds.

In reactions in which hydrocarbons are synthesized as in olefin polymerization, there is considerable heat given off. One defect of fixed or stationary bed processes for olefin polymerization is that this exothermic reaction raises the temperature to such a degree that injurious side reactions result. In the present invention a catalyst to gas ratio by weight of about 2–10 parts of catalyst per part of gas is used, preferably 3–5 parts of catalyst per part of gas, so that the heat of the reaction is absorbed by the catalyst and the temperature rise is restricted to less than 25° F. in the reactor. Moreover, with suspensions of 5–35 lbs./cubic foot hindered settling and mixing takes place so that uniform temperatures are maintained throughout the reaction zone. Consequently, the catalyst and gases may be introduced at temperatures less than the reaction temperature, preferably 50–100° F. less than the reaction temperature.

Under the conditions stated, the olefin which undergoes polymerization and under the pressure conditions stated the polymer is largely adsorbed or absorbed by the catalyst and thereafter the reaction products are taken off overhead through line 10 and discharged into a cyclone separator 12 where the gases not adsorbed or absorbed by the catalyst are withdrawn overhead through line 14, while the catalyst is withdrawn through star feeder 15 and pipe 16 into an injection means 20. The gas or vapors in line 14 will still contain some catalyst, under normal conditions of operation, and this suspension of gas containing some catalyst is discharged into a second cyclone separator 22 where substantially the remainder of the catalyst is separated and withdrawn through a star feeder 26 and a pipe 30 and discharged into injection means 20. A tail gas is withdrawn from cyclone separator 22 through line 32 and rejected from the system. Any residual product in the tail gas may be recovered by known means such as absorption in oil.

Referring back to the injection means 20, a carrier gas such as steam, nitrogen, or some other gas or vapor is discharged into the injection means through line 40 where it forms a suspension of catalyst in the carrier gas, and then the carrier gas is discharged through line 42 into a heater such as a fired coil 44, where the suspension is heated to a temperature of 500 to 800° F. Thereafter the heated suspension is withdrawn through line 48 carrying a reducing valve 50, in which reducing valve the pressure is lowered to about 5–50 lbs./sq. in., whereupon the suspension is discharged into a cyclone separator 55 where the polymers adsorbed by the catalyst in reactor 6 are released therefrom; in other words, the sharp decrease in pressure liberates the polymers which were formed in reactor 6 and adsorbed by the catalyst. The carrier gas and the polymers are withdrawn through line 60 and delivered to a product recovery system (not shown). The separated catalyst is withdrawn from cyclone separator 55 through line 65 and discharged into injector 70 where it is mixed with steam or other carrier gas introduced through line 72 into the said injector, forming therein a suspension which is withdrawn through line 74 and discharged into a second cyclone separator 80. In this latter cyclone separator a further quantity of the polymers formed in the reactor is liberated from the catalyst and the released polymers and carrier gas are withdrawn through line 82 and discharged into line 60 for delivery to the recovery system, together with gas and vapors recovered from cyclone separator 55. In order to further strip or deplete the catalyst from adsorbed or occluded polymers, steam or some other inert gas may be discharged into cyclone separator 80 through line 90. The steam employed or admitted to the system through line 72 and 90 may be at a temperature of from about 500–1000° F.

The catalyst recovered in cyclone separator 80 is withdrawn through a star feeder 92 and line 96 and delivered into an injector 97 where it is suspended in steam or other carrier gas from pipe 99 and there delivered to a pump or a series of pumps 100 where it is compressed and thence discharged through line 4 into injection means 3 for recirculation in the system previously described. Line 96 carries branch or shunt line 102 in which is disposed a cooler 105, through which cooler the catalyst may be passed in order to lower its temperature to that desired. Also, catalyst in line 4 may, if desired, be passed through line 110 into a regenerator 112 where carbonaceous or other deposits may be removed from the catalyst in the presence of air or other oxidizing gas in known manner, whereupon regenerated catalyst is returned to line 4 from regeneration vessel 112 through line 114. Ordinarily, however, in an operation of the type here in question, the catalyst is not regenerated but is used repeatedly day after day without regeneration until finally its activity has been reduced to the point where it is no longer practical to use it, whereupon it is rejected from the system and supplanted by a supply of freshly prepared catalyst.

My invention resides in the foregoing process characterized chiefly by the feature of carrying out a polymerization of olefins, such as normally gaseous olefins, in the presence of a solid catalyst which may be phosphoric acid supported on kieselguhr hereinbefore described, or it may be any other well known solid catalyst which has adsorptive properties as phosphoric acid on silica gel, in which the polymerization proper is carried out in an environment operated under a high pressure of say 600 lbs./sq. in., for example, and after the catalyst containing the polymers formed therein is removed from the reaction zone, the pressure is greatly reduced whereupon the polymers are liberated from the catalyst and recovered.

The invention has been illustrated by an example of polymerization of olefins to form high molecular weight hydrocarbons, say $C_8$ to $C_{12}$ from $C_3$ and $C_4$ hydrocarbons. However, it is not limited in scope by this example but includes any synthesis reaction where larger molecules are formed, and at lower pressures or high temperatures the larger molecules are released from the catalyst on which they are adsorbed during the reaction. Examples of such processes are the formation of hydrocarbons or oxygenated hydrocarbons from carbon monoxide and hydrogen as in the Fischer type of process, alkylation of olefins by isoparaffins, and esterification of alcohols and acids.

The same apparatus may be employed to recover hydrocarbons from gases such as pentane from natural gas by silica gel, butadiene from cracked gases by adsorptive solids containing copper chloride, and benzol from coke oven gases by activated charcoal. In these latter cases the adsorptive material is not an active catalyst in effecting a chemical reaction. As in the case of chemical reactions, however, there is an exothermic heat of adsorption and it is an important phase of this invention that sufficient solid is circulated so that the temperature used in the absorber is limited to less than 25° F.

In summary, emphasis should be placed on the feature of the invention of having uniform temperatures in the reactor or absorber. Sufficient solid is recirculated so that the heats of reaction or adsorption are accommodated by the solid so that the temperature rise in the reactor or absorber is limited to less than 25° F. Moreover, due to the mixing of the solid in the reactor or absorber uniform temperatures exist and side reactions are avoided. Due to the low temperature rise and the uniformity of temperatures, the adsorption of the heavier molecules is facilitated and greater recovery is made possible.

While I have given specific details as to polymerizing of gaseous olefins, it will be understood that my invention is not limited to such polymerization but includes any reaction carried out under pressure where the product formed is adsorbed by a solid adsorbent catalyst or other adsorbent solid material, which product is recovered by conveying the solid containing the product from the reaction zone to a zone of decreased pressure wherein, due to the decreased pressure, the product is released from the solid. My invention also includes accurate temperature control in the reaction zone obtained by recycling relatively large amounts of heat-conditioned solid material thereto, which material is maintained in an ebullient, turbulent state affording thorough intermixing of all portions of the catalyst and thus securing a uniform temperature throughout the said zone.

What I claim is:

1. A continuous process of polymerizing olefins which comprises feeding an olefin in gasiform state with powdered catalyst suspended therein into a reaction zone, the weight ratio of catalyst to olefin being from about 2 to 10 parts of catalyst per part of olefin, causing the catalyst to be maintained in a ebullient state in the form of a dense phase mass by flowing the said olefin upwardly through the reaction zone at a linear velocity of from about 5 to about 12 feet per second to afford uniform mixing of all portions thereof, maintaining a pressure in the reaction zone of from about 100 to 400 pounds per square inch, permitting the reactants to remain in the reaction zone for a sufficient period of time to effect the desired reaction, removing the catalyst containing polymers adsorbed thereon from the reaction zone and conducting the said catalyst to a zone of lower pressure than the reaction zone, and recovering polymerized olefins.

2. The process set forth in claim 1 in which the feed stock contains a normally gaseous olefin and the catalyst is orthophosphoric acid supported on kieselguhr.

3. The process set forth in claim 1 in which the catalyst recovered from the reaction zone and containing adsorbed polymers is heated to facilitate polymer recovery.

4. The process set forth in claim 1 in which sufficient catalyst at a temperature below reaction temperatures is present in the reaction zone to prevent a temperature rise of more than 25° F. by absorption of the heat released during the reaction.

5. The process set forth in claim 1 in which the catalyst has a particle size of from about 50 to 400 mesh.

6. A continuous process for the synthesis of hydrocarbons in the gaseous phase comprising synthesizing the hydrocarbons in a reaction zone in the presence of a powdered catalyst maintained in a turbulent, ebullient state of suspension in an upwardly flowing gasiform medium whose linear velocity permits concentration of catalyst by delayed settling, maintaining sufficient pressure during the process to cause substantial adsorption of the products formed within the body of the catalyst, withdrawing the catalyst from the reaction zone, heating the withdrawn catalyst and recovering adsorbed products from the catalyst by decreasing the pressure.

7. A continuous process for the polymerization of hydrocarbons from gaseous olefins which comprises carrying out said polymerization in a reaction zone in the presence of a powdered catalyst in a turbulent, ebullient state of suspension in an upwardly flowing gasiform medium whose linear velocity permits concentration of catalyst by delayed settling, maintaining sufficient pressure to cause substantial adsorption of the polymerization products formed within the body of the catalyst withdrawing the catalyst from said reaction zone, and recovering polymerization products from the catalyst by decreasing the pressure thereon.

8. A continuous process for the synthesis of hydrocarbons from a gaseous feedstock containing a substantial quantity of isobutylene which comprises carrying out the synthesis in a reaction zone in the presence of a powdered catalyst in a turbulent, ebullient state of suspension in an upwardly flowing gasiform medium whose linear velocity permits concentration of catalyst by delayed settling, maintaining sufficient pressure to cause substantial adsorption of the products formed within the body of the catalyst withdrawing catalyst from the reaction zone, and recovering products from the catalyst by decreasing the pressure.

9. A continuous process for the synthesis of hydrocarbons in gaseous phase comprising carrying out the synthesis in a reaction zone in the presence of a powdered catalyst in a turbulent, ebullient state of suspension in an upwardly flowing gasiform medium whose linear velocity permits concentration of catalyst by delayed settling, said powdered catalyst comprising orthophosphoric acid supported on kieselguhr, maintaining sufficient pressure to cause substantial adsorption of the products formed within the body of the catalyst withdrawing catalyst from said reaction zone, and recovering products from the catalyst by decreasing the pressure.

CHARLES E. HEMMINGER.